United States Patent
Madaan (10) Patent No.: US 10,447,348 B2
(45) Date of Patent: Oct. 15, 2019

(54) NEAR-FIELD COMMUNICATION (NFC) CHIP ACTIVATION

(71) Applicant: PayPal, Inc., San Jose, CA (US)

(72) Inventor: Gautam Madaan, San Jose, CA (US)

(73) Assignee: PAYPAL, INC., San Jose, CA (US)

(*) Notice: Subject to any disclaimer, the term of this patent is extended or adjusted under 35 U.S.C. 154(b) by 0 days.

(21) Appl. No.: 15/856,561

(22) Filed: Dec. 28, 2017

(65) Prior Publication Data

US 2019/0207655 A1 Jul. 4, 2019

(51) Int. Cl.
*H04B 5/00* (2006.01)
*H04B 10/079* (2013.01)
*G06K 19/07* (2006.01)
*H04W 4/80* (2018.01)

(52) U.S. Cl.
CPC ......... *H04B 5/0043* (2013.01); *H04B 5/0031* (2013.01); *H04B 5/0068* (2013.01); *H04B 10/07955* (2013.01); *G06K 19/0723* (2013.01); *H04W 4/80* (2018.02)

(58) Field of Classification Search
CPC .. H04B 5/0031; H04B 5/0043; H04B 5/0056; H04B 5/02; H04B 10/07955; H04W 4/80; G06F 19/0723
See application file for complete search history.

(56) References Cited

U.S. PATENT DOCUMENTS

| | | | | |
|---|---|---|---|---|
| 7,725,388 B2* | 5/2010 | Wilkinson | .............. | G06F 21/36 705/39 |
| 9,426,604 B1* | 8/2016 | Cordes | ................. | H04B 5/0031 |
| 9,451,390 B2* | 9/2016 | Bergh | ................. | H04M 1/7253 |
| 2006/0079180 A1* | 4/2006 | Sinivaara | ................. | H04B 5/00 455/41.2 |
| 2010/0176948 A1* | 7/2010 | Garrett | .................... | H04B 5/00 340/572.1 |
| 2013/0196595 A1* | 8/2013 | Byrne | ............... | H04W 52/0251 455/41.1 |
| 2013/0299596 A1* | 11/2013 | Choi | .................... | G06Q 20/227 235/492 |
| 2015/0229763 A1* | 8/2015 | Zuo | ..................... | H04L 65/1069 455/414.1 |
| 2015/0339659 A1* | 11/2015 | Ballesteros | ........ | G06Q 20/3229 705/76 |
| 2017/0295456 A1* | 10/2017 | Tanabe | .................... | H02J 50/80 |

* cited by examiner

*Primary Examiner* — Ankur Jain
(74) *Attorney, Agent, or Firm* — Maschoff Brennan (57) ABSTRACT

According to one or more aspects of the present disclosure, operations may include monitoring a magnetic field that is around an electronic device. The operations may further include determining, based on the monitoring, that a change in the magnetic field deviates more than an expected amount. In addition, the operations may include, in response to determining that the change in the magnetic field deviates more than the expected amount, activating a near-field communication chip included in the electronic device.

15 Claims, 3 Drawing Sheets

NEAR-FIELD COMMUNICATION (NFC) CHIP ACTIVATION

FIELD

The embodiments discussed in the present disclosure are related to activation of a near-field communication (NFC) chip.

BACKGROUND

In some instances, electronic devices perform near-field communications (NFC) in which the electronic devices may communicate with each other using short-range wireless communications when within a relatively close proximity to each other (e.g., within 25 centimeters of each other). The electronic devices may include NFC chips that may be used in the corresponding communications.

The subject matter claimed in the present disclosure is not limited to embodiments that solve any disadvantages or that operate only in environments such as those described above. Rather, this background is only provided to illustrate one example technology area where some embodiments described herein may be practiced.

BRIEF DESCRIPTION OF THE DRAWINGS

Example embodiments will be described and explained with additional specificity and detail through the use of the accompanying drawings in which.

DESCRIPTION OF EMBODIMENTS

Near-field communications (NFC) protocols may be used to enable electronic devices to communicate with each other using short-range (e.g., around less than 25 centimeters) wireless communication technologies. Portable electronic devices (e.g., tablets, smartphones, etc.) often include NFC chips that enable the portable electronic devices to perform NFC operations. For example, one or more NFC chips involved in an NFC operation may be configured to generate an electromagnetic field that may be detected by another NFC chip participating in the operations via electromagnetic induction. In these or other embodiments, the NFC chips used in the portable electronic devices may include NFC chips that in some instances may be in a constantly activated state to detect and/or generate electromagnetic fields that may be used in the NFC operations. In some instances, maintaining the NFC chips in an activated state may require increased use of power, which may cause undesirable effects such as reduced battery life.

According to one or more embodiments of the present disclosure, systems and methods may be related to having a default setting for NFC chips be that the NFC chips are deactivated instead of the common practice of having the NFC chips be activated. Additionally or alternatively, the NFC chips may be activated in response to detecting that another NFC chip may be close by.

By way of example, in some embodiments, an electronic device that includes an NFC chip may also include a magnetometer that may be configured to detect magnetic fields and provide readings of the detected magnetic fields. The detected readings may typically be used to facilitate with location or orientation operations (e.g., used for a compass, etc.). However, in some instances, electromagnetic fields that may be generated by other NFC chips may change the magnetic fields that may be detected by the magnetometers such that the readings provided by the magnetometers may deviate from what may be expected in instances in which the electronic device is near an NFC chip external to the electronic device ("external NFC chip"). As such, in some embodiments of the present disclosure, magnetometer readings may be monitored to monitor the magnetic field that may be detected by the corresponding magnetometer. In response to the readings deviating from an expected value range, which may indicate that the electronic device is near an external NFC chip, the NFC chip internal to the electronic device ("internal NFC chip") may be activated. Use of the already obtained magnetometer readings to identify the presence of the external NFC chip rather than maintaining the internal NFC chip in an activated state to identify the presence of the external NFC chip may reduce the overall power consumption of the electronic device.

In the present disclosure, reference to "activating" or "deactivating" NFC chips may include changing modes or power states of NFC chips. For example, NFC chips may have a powered up state in which the NFC chips may be ready to perform certain operations. The NFC chips may also have a powered down state in which the NFC chips are completely shut down. Additionally or alternatively, NFC chips may have different modes while in the powered up state. For example, NFC chips may have an active mode in which the NFC chips may be able to read data from or write data to other nearby NFC chips. Additionally, NFC chips may have a passive mode while being powered up in which the NFC chips may be listening for other nearby NFC chips but does not perform any other operations unless requested (e.g., by another NFC chip or a user). In the present disclosure, by way of example, "deactivating" an NFC chip may include changing the NFC chip from the active mode to the passive mode and "activating" an NFC chip may include changing the NFC chip from the passive mode to the active mode. Additionally or alternatively, "deactivating" an NFC chip may include shutting down the NFC chip while it is in the active mode or in the passive mode to place the NFC chip in the powered down state. In these or other embodiments, "activating" an NFC chip may include changing the NFC chip from the powered down state to the powered up state. Additionally or alternatively, the NFC chip may be placed in in the active mode or the passive mode as part of the powering up and activating from the powered down state.

Figure 1:
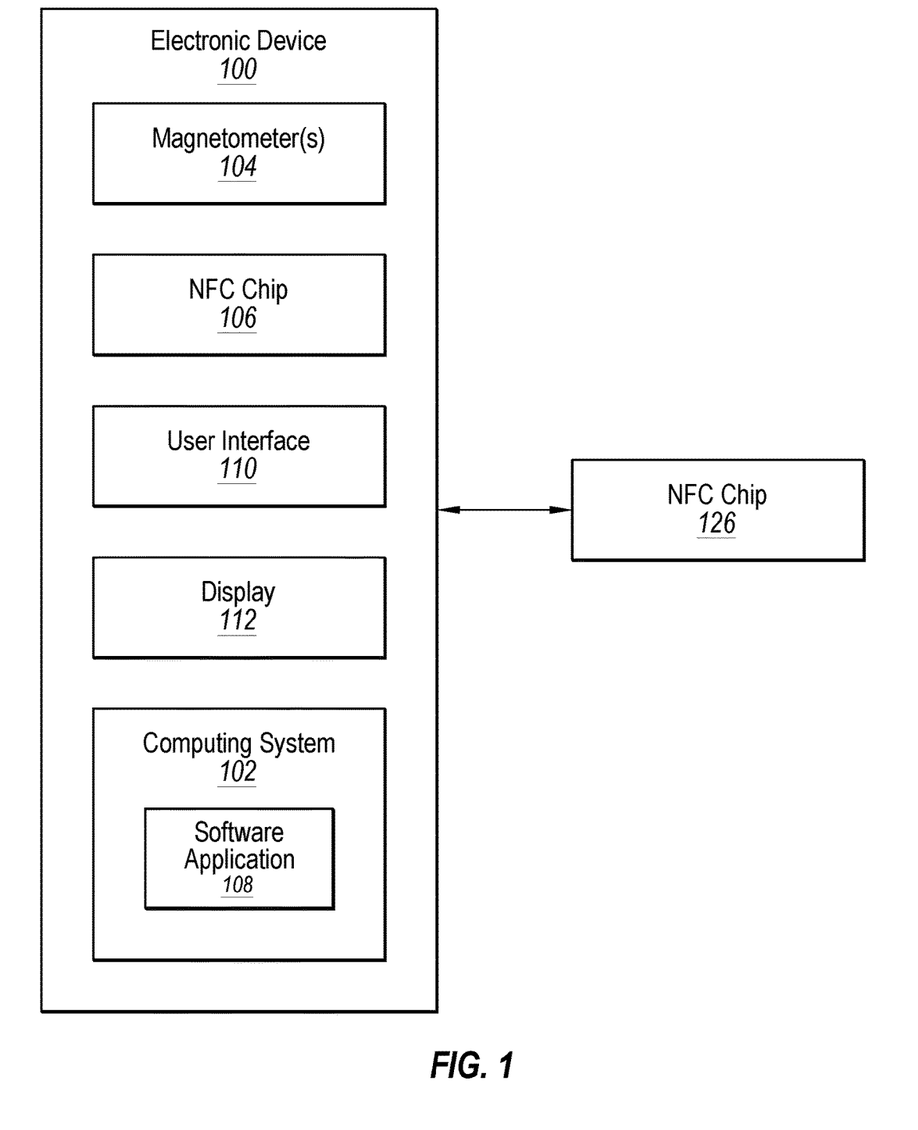
FIG. 1 illustrates an example electronic device configured to activate a near-field communication (NFC) chip based on magnetic field changes.

FIG. 1 illustrates an example electronic device 100 ("device 100") configured to activate an NFC chip based on magnetic field detection. The device 100 may be arranged according to one or more embodiments of the present disclosure. The device 100 may be any applicable electronic device that may be configured to perform NFC operations. For example, the device 100 may be a smartwatch, a cellular phone, a smartphone, a personal data assistant (PDA), a laptop computer, a personal computer, a tablet computer, or any other similar device. In some embodiments, the device 100 may include a computing system 102, one or more magnetometers 104, an internal NFC chip 106, a user interface 110, and a display 112.

The magnetometers 104 may include any suitable system, apparatus, or device configured to detect a magnetic field. In some embodiments, the magnetometers 104 may be configured to detect a magnitude and a direction of the magnetic field. Additionally or alternatively, the magnetometers 104 may be configured to generate or provide readings that indicate the detected magnetic field. For example, the readings may indicate the magnitude and/or the direction of the detected magnetic field.

The internal NFC chip 106 may include any suitable system, apparatus, or device configured to facilitate NFC operations. For example, the internal NFC chip 106 may be configured to generate an electromagnetic field that may be detected by another NFC chip such as an external NFC chip 126. In some embodiments, the internal NFC chip 106 may be configured to generate the electromagnetic field in response to an internal command given by another element of the device 100 (e.g., the computing system 102) and/or in response to perceiving another electromagnetic field generated by the external NFC chip 126.

The external NFC chip 126 may be external to the device 100 and may be the same as or substantially similar to the internal NFC chip 106. Additionally, in some embodiments, the external NFC chip 126 may be included in another electronic device or any other applicable system. For example, in some embodiments, the external NFC chip 126 may be included in or part of a payment terminal configured to perform operations related to financial transactions (e.g., payments) using NFC operations and technology. In these or other embodiments, the external NFC chip 126 and the internal NFC chip 106 may be configured to communicate with each other to perform the operations. In the present description of FIG. 1, use of the terms "internal" and "external" are given with from the perspective of the device 100 to help aid in explaining concepts disclosed herein. As such, the term "internal" may refer to being inside or part of the device 100. Similarly, the term "external" may refer to being outside or not part of the device 100 even in instances in which the subject component (e.g., the external NFC chip 126) is inside or part of another device or system.

In these or other embodiments, the internal NFC chip 106 may be configured to include, as a data signal, data in the electromagnetic field that may be generated by the internal NFC chip 106. Additionally or alternatively, the external NFC chip 126 may also be configured to include data in the electromagnetic field that may be generated by the external NFC chip 126. The data may include any suitable type of data. In some embodiments, the data may include financial information (e.g., credit card information, funds transfer information, payment service account (e.g., PAYPAL®), etc.) that may be used in a financial transaction.

The internal NFC chip 106 may be configured to have a default setting in which the internal NFC chip 106 may be deactivated. Additionally, as described in further detail below, the internal NFC chip 106 may be activated based on the magnetic field detection of the magnetometers 104.

For example, as indicated above, the external NFC chip 126 may be configured to generate and emit an electromagnetic field. As the device 100 approaches the external NFC chip 126, the electromagnetic field generated by the external NFC chip 126 may be detected by the magnetometers 104, which may be reflected in the readings produced by the magnetometers 104. For instance, in some embodiments, the magnetic field that may be detected by the magnetometers 104 prior to the device 100 being in a detectable range of the electromagnetic field generated by the external NFC chip 126 (e.g., the magnetic field of the earth) may have a fairly consistent or predictable nature to it. As such, the readings and corresponding changes in the readings may also have a fairly consistent or predictable nature to them. However, as the device 100 approaches the external NFC chip 126, the electromagnetic field generated by the external NFC chip 126 may disrupt the magnetic field that is around the device 100 and that is detected by the magnetometers 104. As such, the magnetic field may deviate more than what would be expected in instances in which the electromagnetic field generated by the external NFC chip 126 were not present. By way of example, as the magnetometers 104 approach the external NFC chip 126, the electromagnetic field generated by the external NFC chip may change the magnitude and/or the direction of the magnetic fields in a manner that is not consistent with changes that may occur from normal movement.

The deviation in the magnetic field more than expected may be reflected by the readings of the magnetometers 104 deviating more than an expected value. As such, as detailed further below, in some embodiments, the internal NFC chip 106 may be activated based on the magnetic field detection of the magnetometers 104 due to the magnetic field detection being affected by the electromagnetic field generated by the external NFC chip 126.

The user interface 110 may include any component, device, system, or combination thereof that is configured to provide input from a user to the device 100 via a user action. For example, the user interface 110 may include a mouse, a track pad, a touch screen, a keyboard, a microphone and corresponding voice recognition applications, or any other system or device that may interface with the device 100 to provide user input to the device 100. In some embodiments, the user may provide user input via the user interface 110.

The display 112 may be configured as one or more displays, like an LCD, LED, or other type of display. The display 112 may be configured to present content such as video, text captions, user interfaces, and other data as directed by the computing system 102. In addition, the display 112 may be configured to present content in response to user input that may be provided via the user interface 110. In these or other embodiments, the content presented on the display be configured to receive user input that may be provided via the user interface 110.

The computing system 102 may include any suitable arrangement of components that may be configured to direct the performance of operations of the device 100. The performance of operations as directed by the computing system 102 may be done by the computing system 102 itself or by one or more other components of the device 100 that may be controlled by the computing system 102.

In some embodiments, the computing system 102 may direct the activation and/or the deactivation of the NFC chip 106. For example, in some embodiments, the computing system 102 may be configured to monitor magnetic fields around the device 100 and may activate the NFC chip 106 based on the monitored magnetic fields.

In particular, in some embodiments, the computing system 102 may be communicatively coupled to the magnetometers 104 and may be configured to obtain the readings produced by the magnetometers 104. In these and other embodiments, the computing system 102 may be configured to monitor the magnetometer readings. Additionally or alternatively, the computing system 102 may be configured to identify changes in the magnetic field based on the monitoring of the magnetometer readings. In these or other embodiments, the computing system 102 may be configured to determine whether an identified change in the magnetic field deviates more than may be expected.

For example, as indicated above, when not being disrupted by certain electromagnetic fields such as those produced by the external NFC chip 126, the magnetometer readings may have changes as the device 100 moves around, but the changes may be within a certain range such that the magnetometer readings from one point in time to another point in time may be within an expected value range. Therefore, in instances in which the magnetometer readings deviate from the expected value range, the measured magnetic field may be disrupted by an electromagnetic field such as that which may be generated by the external NFC chip 126. The computing system 102 may thus be configured to identify that the magnetometer readings deviate from the expected value range and may be configured to activate the internal NFC chip 106 in response to the identification.

In some embodiments determining whether the magnetometer readings deviate from the expected value range may be based on an observed analysis as to how magnetometer readings change while the magnetometers are being moved toward electromagnetic fields that may be associated with NFC communications. For example, in some implementations, NFC chips may be configured to perform communications in a frequency range of 12.5-14.5 MHz. As such, in some instances, changes in magnetometer readings may be observed in response to the presence of electromagnetic signals within that frequency range as compared to when such electromagnetic signals are not present. Additionally, the readings may be observed at different signals strengths. The differences in the behavior of the readings when the signals are present or not present and/or at the different signal strengths may be used to identify when deviations in the magnetometer readings may indicate the presence of an external NFC chip such as the external NFC chip 126.

In some embodiments, the computing system 102 may be configured to identify that the magnetometer readings deviate from the expected value range by determining whether an identified change in magnetometer readings is greater than a threshold amount. In some embodiments, the threshold amount may be determined based on an observational analysis such as described above.

In some embodiments, prior to activating the internal NFC chip 106, the computing system 102 may be configured to cause the presentation of a query on the display 112 in response to determining that the magnetic field deviates from an expected amount. The query may ask about activating the internal NFC chip 106. In these or other embodiments, the query may indicate that an external NFC chip (e.g., the external NFC chip 126) has been detected as part of asking about activating the internal NFC chip 106. In these or other embodiments, the user may respond to the query via the user interface 110. Additionally or alternatively, the computing system 102 may activate the internal NFC chip 106 or maintain the internal NFC chip 106 as being deactivated based on the response to the query.

In some embodiments, the computing system 102 may be configured to perform different operations based on different degrees of deviation of the magnetic field. For example, in some instances, a degree of deviation of the magnetic field from what may be expected may be relatively small but may also indicate that an external NFC chip 126 may be nearby, but with a relative amount of uncertainty than if the degree of deviation were greater. As such, in some embodiments, the computing system 102 may be configured to cause presentation of the query in response to a first degree of deviation of the magnetic field from what may be expected in which the first degree of deviation may have a certain level of uncertainty associated with it. In these or other embodiments, the computing system 102 may be configured to directly activate the internal NFC chip 106 without the query in response to a second degree of deviation that is greater than the first degree of deviation such that the second degree of deviation may have less uncertainty than the first degree of deviation.

In some embodiments, the first degree of deviation and the second degree of deviation may be respectively associated with a first threshold amount of deviation from the expected value and a second threshold amount of deviation from the expected value in which the first and second thresholds are threshold amounts analogous to that described above. In these and other embodiments, the computing system 102 may be configured to cause presentation of the query in response to a change in the magnetic field deviating from an expected amount by more than a first threshold value and by less than a second threshold value.

Additionally or alternatively, in some embodiments, in response to activating the internal NFC chip 106, the computing system 102 may be configured to launch a software application 108. For example, in some embodiments, the software application 108 may be configured to use information that may be derived from NFC communications. By way of example, the software application 108 may include a payment processing application that is configured to perform one or more payment operations in response to and/or based on information included in NFC communications that may be received by the internal NFC chip 106. As such, based on the software application 108 being configured to use NFC information, the computing system 102 may be configured to launch the software application 108.

In some, the computing system 102 may be configured to deactivate the internal NFC chip 106 after the internal NFC chip 106 has been activated. For example, in some embodiments, the computing system 102 may be configured to determine that NFC related operations have terminated and may deactivate the internal NFC chip 106 in response to such a determination. For example, the computing system 102 may be configured to determine that NFC related operations that may be performed by the software application 108 (e.g., a payment transaction) have terminated and may deactivate the internal NFC chip 106 in response to such a determination. As another example, the computing system 102 may be configured to determine that the device 100 is in an idle state or resting position and, in response to such a determination, may deactivate the internal NFC chip 106. As another example, the computing system 102 may be configured to deactivate the internal NFC chip 106 in response to a certain amount of time passing from when the internal NFC chip 106 was activated.

The device 100 may thus be configured to perform operations related to the activating of the internal NFC chip 106 based on magnetic fields, which may improve the power efficiency of the device 100. Modifications, additions, or omissions may be made to FIG. 1 without departing from the scope of the present disclosure. For example, the device 100 may include other elements than those specifically listed. Additionally, any number of different devices or systems may be part of an environment associated with FIG. 1.

Figure 2:
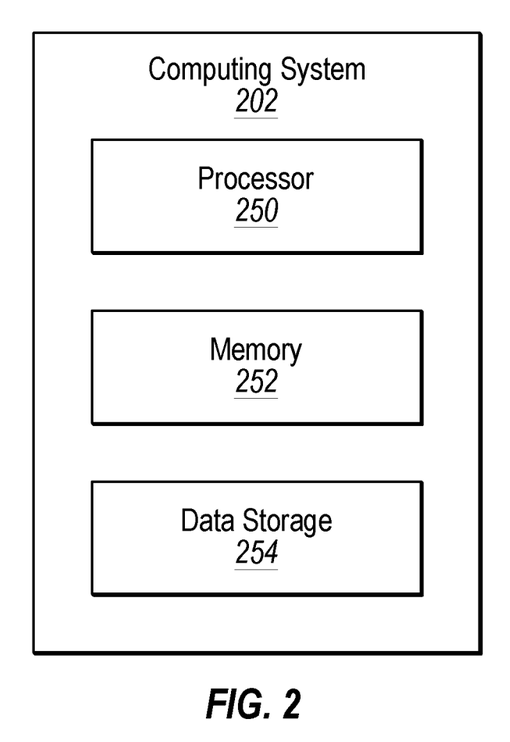
FIG. 2 illustrates a block diagram of an example computing system.

FIG. 2 illustrates a block diagram of an example computing system 202. The computing system 202 may be configured according to at least one embodiment of the present disclosure and may be an example of the computing system 102 of FIG. 1. The computing system 202 may include a processor 250, a memory 252, and a data storage 254. The processor 250, the memory 252, and the data storage 254 may be communicatively coupled.

In general, the processor 250 may include any suitable special-purpose or general-purpose computer, computing entity, or processing device including various computer hardware or software modules and may be configured to execute instructions stored on any applicable computer-readable storage media. For example, the processor 250 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 2, the processor 250 may include any number of processors configured to, individually or collectively, perform or direct performance of any number of operations described in the present disclosure. Additionally, one or more of the processors may be present on one or more different electronic devices, such as different servers.

In some embodiments, the processor 250 may be configured to interpret and/or execute program instructions and/or process data stored in the memory 252, the data storage 254, or the memory 252 and the data storage 254. In some embodiments, the processor 250 may fetch program instructions from the data storage 254 and load the program instructions in the memory 252. After the program instructions are loaded into memory 252, the processor 250 may execute the program instructions.

For example, in some embodiments, a software application such as the software application 108 of FIG. 1 may be included in the data storage 254 as program instructions. The processor 250 may fetch the program instructions from the data storage 254 and may load the program instructions in the memory 252. After the program instructions of the software application are loaded into memory 252, the processor 250 may execute the program instructions such that the computing system 202 may perform or direct the performance of the operations associated with the software application as directed by the instructions.

The memory 252 and the data storage 254 may include computer-readable storage media for carrying or having computer-executable instructions or data structures stored thereon. Such computer-readable storage media may include any available media that may be accessed by a general-purpose or special-purpose computer, such as the processor 250. By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. In these and other embodiments, the term "non-transitory" as explained herein should be construed to exclude only those types of transitory media that were found to fall outside the scope of patentable subject matter in the Federal Circuit decision of In re Nuijten, 500 F.3d 1346 (Fed. Cir. 2007). Combinations of the above may also be included within the scope of computer-readable media.

Modifications, additions, or omissions may be made to the computing system 202 without departing from the scope of the present disclosure. For example, in some embodiments, the computing system 202 may include any number of other components that may not be explicitly illustrated or described.

Figure 3:
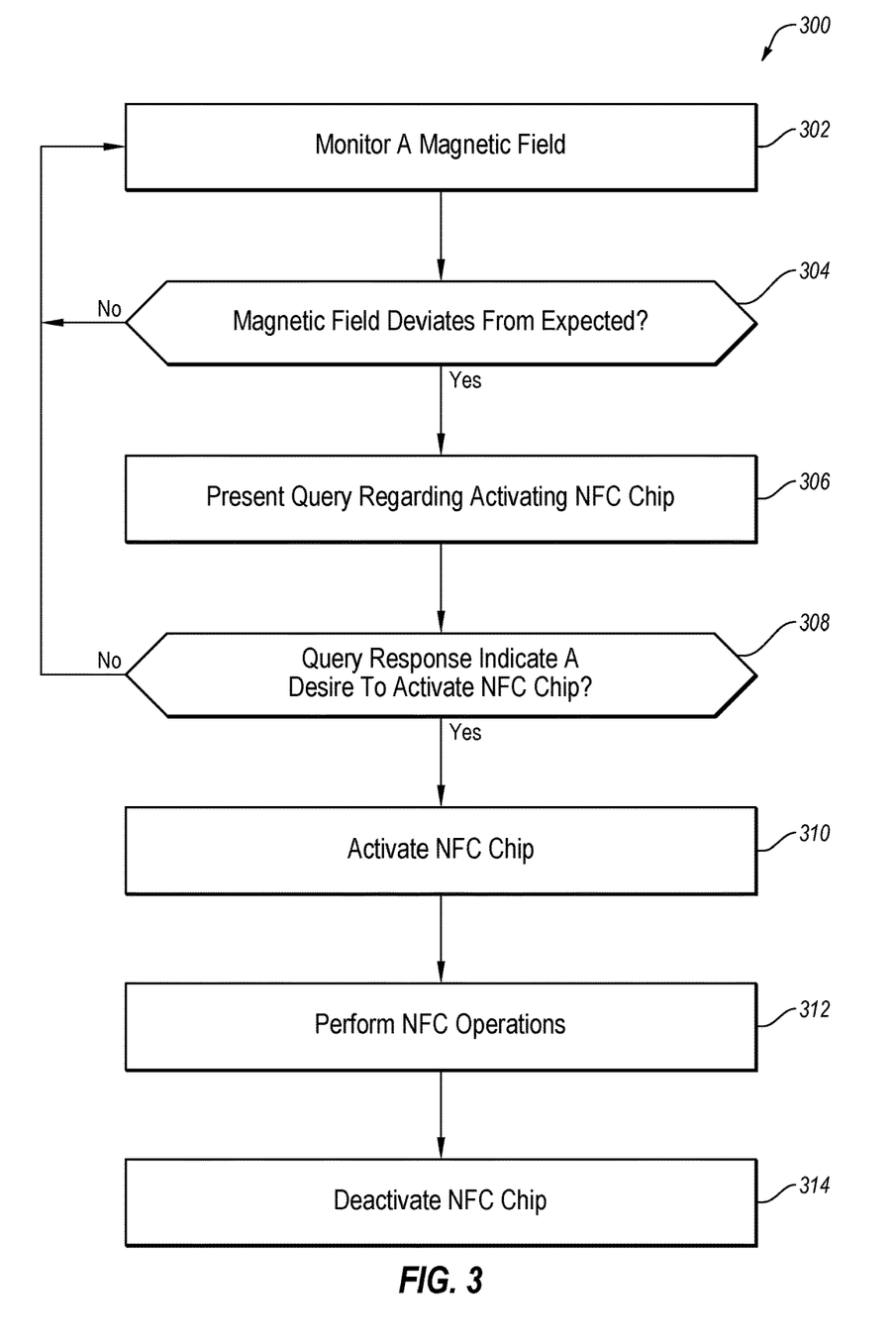
FIG. 3 is a flowchart of an example method to activate an NFC chip based on magnetic field detection.

FIG. 3 is a flowchart of an example method 300 to activate an NFC chip based on magnetic field detection. The method 300 may be arranged in accordance with at least one embodiment described in the present disclosure. The method 300 may be implemented, in some embodiments, by the device 100 of FIG. 1 or the computing system 202 of FIG. 2. In some embodiments, the method 300 may result from operations performed by a system based on instructions stored in one or more computer-readable media. Although illustrated as discrete blocks, various blocks may be divided into additional blocks, combined into fewer blocks, or eliminated, depending on the particular implementation. The NFC chip that may be activated based on the method 300 may have a default setting in which the NFC chip is deactivated.

The method 300 may begin at block 302 where a magnetic field around an electronic device that may include an NFC chip may be monitored. In some embodiments, the magnetic field may be monitored by monitoring readings of one or more magnetometers of the electronic device, such as described above with respect to FIG. 1

At block 304, it may be determined whether the magnetic field deviates from what may be expected. For example, it may be determined whether a change in the magnetic field deviates from an expected amount. In some embodiments, the change may be identified based on monitoring the magnetic field. In these and other embodiments, the determination may be made according to one or more of the related operations described above with respect to FIG. 1. In response to a determination that the change does not deviate from the expected amount, the method 300 may return to block 302 from block 304. In response to a determination that the change does deviate from the expected amount, the method 300 may proceed from block 304 to block 306.

At block 306, a query may be presented (e.g., presented on a display of the electronic device) regarding activation of the NFC chip. In some embodiments, the query may be presented according to one or more of the operations and/or bases described above with respect to FIG. 1 regarding presentation of a query.

At block 308, a determination may be made regarding whether a response to the query presented at block 306 indicates a desire to activate the NFC chip. In response to the query response indicating that there is not a desire to activate the NFC chip, the method 300 may return to block 302 from block 308. In response to the query response indicating that there is a desire to activate the NFC chip, the method 300 may proceed from block 308 to block 310.

At block 310, the NFC chip may be activated. In some embodiments, the method 300 may vary in that the NFC chip may be activated in response to determining at block 304 that the change in the magnetic field does deviate more than the expected amount. In other words, in some embodiments, in response to a determination at block 304 that the change does deviate from the expected amount, the method 300 may proceed from block 304 to block 310. In these or other embodiments, blocks 306 and 308 may thus be omitted. For example, in some embodiments, the method 300 may merely omit blocks 306 and 308. Additionally or alternatively, in some embodiments, operations related to blocks 306 and 308 may be performed in response to the change in the magnetic field being greater than a first degree but less than a second degree such as described above. In other embodiments, operations related to blocks 306 and 308 may always be performed.

In some embodiments, the method 300 may include block 312. At block 312, one or more operations related to NFC communications may be performed in response to the NFC chip being activated. In these or other embodiments, a software application configured to perform the operations related to NFC communications may be launched at block 312.

In these or other embodiments, the method 300 may include block 314. At block 314, the NFC chip may be deactivated. In some embodiments, the NFC chip may be deactivated according to one or more of the operations and/or bases described above with respect to FIG. 1 regarding deactivating the internal NFC chip 106.

Modifications, additions, or omissions may be made to method 300 without departing from the scope of the present disclosure. For example, the functions and/or operations described may be implemented in differing order than presented or one or more operations may be performed at substantially the same time. Additionally, one or more operations may be performed with respect to each of multiple virtual computing environments at the same time. Furthermore, the outlined functions and operations are only provided as examples, and some of the functions and operations may be optional, combined into fewer functions and operations, or expanded into additional functions and operations without detracting from the essence of the disclosed embodiments.

As indicated above, the embodiments described in the present disclosure may include the use of a special purpose or general purpose computer (e.g., the processor 350 of FIG. 3) including various computer hardware or software modules, as discussed in greater detail below. Further, as indicated above, embodiments described in the present disclosure may be implemented using computer-readable media (e.g., the memory 352 or data storage 354 of FIG. 3) for carrying or having computer-executable instructions or data structures stored thereon.

In some embodiments, the different components, modules, engines, and services described herein may be implemented as objects or processes that execute on a computing system (e.g., as separate threads). While some of the systems and methods described in the present disclosure are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used in the present disclosure to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited in the present disclosure are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. An electronic device comprising:
   a near-field communication chip that has a default setting in which the near-field communication chip is deactivated;
   a magnetometer configured to detect a magnetic field and provide readings of the detected magnetic field; and a computing system configured to control performance of operations, the operations comprising:
  monitoring the readings of the magnetometer;
  identifying a change in the magnetic field based on monitoring the readings of the magnetometer;
  determining that the change in the magnetic field deviates from an expected amount by more than a first threshold value, the first threshold value being based on a first degree of certainty that another near-field communication chip is nearby;
  determining that the change in the magnetic field deviates from the expected amount by less than a second threshold value, the second threshold value being based on a second degree of certainty that another near-field communication chip is nearby in which the first degree of certainty is lower than the second degree of certainty;
  presenting, in response to determining that the change in the magnetic field deviates from the expected amount by more than the first threshold value and less than the second threshold value, a request to activate the near-field communication chip; and
  in response to determining that the change in the magnetic field deviates from the expected amount and based on a response to the request, activating the near-field communication chip.

2. The electronic device of claim 1, wherein the operations further comprise: activating the near-field communication chip in response to determining that the change in the magnetic field deviates from the expected amount in a particular manner that is associated with a transmission by a transmitting near-field communication device.

3. The electronic device of claim 1, wherein the operations further comprise launching a software application configured to use information derived from near-field communication in response to activating the near-field communication chip.

4. The electronic device of claim 1, wherein the near-field communication chip has been deactivated following the activation and the operations further comprise:
  identifying an other change in the magnetic field based on monitoring the readings of the magnetometer; and
  automatically activating the near-field communication chip independent of user input in response to determining that the other change deviates from the expected amount by more than the second threshold value.

5. The electronic device of claim 1, wherein the operations further comprise deactivating the near-field communication chip after activating the near-field communication chip in response to one or more factors selected from a group of factors consisting of: termination of near-field communication operations by the electronic device, the electronic device being placed in an idle state, the electronic device being placed in a resting position, and a certain amount of time passing from when the near-field communication chip was activated.

6. One or more non-transitory computer-readable media containing instructions which, in response to being executed by one or more processors, cause a system to perform operations comprising:
  monitoring first readings of a magnetometer of an electronic device, the magnetometer being configured to detect a magnetic field;
  determining, based on monitoring the first readings, that the first readings deviate from an expected value range by more than a first threshold amount, the first threshold amount being based on a first degree of certainty that another near-field communication chip is nearby;
  determining that the first readings deviate from the expected value range by less than a second threshold amount, the second threshold amount being based on a second degree of certainty that another near-field communication chip is nearby in which the first degree of certainty is lower than the second degree of certainty;
  presenting, in response to determining that the first readings deviate from the expected value range by more than the first threshold amount and less than the second threshold amount, a request to activate the near-field communication chip; and
  in response to determining that the first readings deviate from the expected value range by more than the first threshold amount and less than the second threshold amount and based on a response to the request, activating the near-field communication chip.

7. The one or more computer-readable media of claim 6, wherein the operations further comprise:
  deactivating the near-field communication chip after activating the near-field communication chip;
  monitoring second readings of the magnetometer;
  determining, based on monitoring the second readings, that the second readings deviate from the expected value range by more than the second threshold amount; and
  automatically reactivating the near-field communication chip in response to the second readings deviating from the expected value range by more than the second threshold amount.

8. The one or more computer-readable media of claim 7, wherein automatically reactivating the near-field communication chip is in response to determining that the second readings deviate from the expected value range in a particular manner that is associated with a transmission by a transmitting near-field communication device.

9. The one or more computer-readable media of claim 7, wherein deactivating the near-field communication chip after activating the near-field communication chip is in response to one or more factors selected from a group of factors consisting of: termination of near-field communication operations by the electronic device, the electronic device being placed in an idle state, the electronic device being placed in a resting position, and a certain amount of time passing from when the near-field communication chip was activated.

10. The one or more computer-readable media of claim 6, wherein the operations further comprise launching a software application configured to use information derived from near-field communication in response to activating the near-field communication chip.

11. A method comprising:
  monitoring a magnetic field that is around an electronic device;
  identifying a change in the magnetic field based on monitoring the magnetic field;
  comparing the change against a first threshold value and a second threshold value, the first threshold value being based on a first degree of certainty that another near-field communication chip is nearby and the second threshold value being based on a second degree of certainty that another near-field communication chip is nearby in which the first degree of certainty is lower than the second degree of certainty; and
  in response to the change being greater than the first threshold value and less than the second threshold value, performing an activation action with respect to a near-field communication chip included in the electronic device.

12. The method of claim 11, wherein the activation action includes launching a software application configured to use information derived from near-field communication in response to activating the near-field communication chip.

13. The method of claim 11, wherein performing the activation action includes: presenting a request on a display to activate the near-field communication chip; and
   activating the near-field communication chip based on a response to the request.

14. The method of claim 11, further comprising:
   deactivating the near-field communication chip after activating the near-field communication chip;
   identifying, after deactivating the near-field communication chip, an other change in the magnetic field;
   comparing the other change against the first threshold value and the second threshold value; and
   in response to the other change being greater than the second threshold value, automatically activating the near-field communication chip independent of user input in response to the change being greater than both the first threshold value and the second threshold value.

15. The method of claim 11, further comprising deactivating the near-field communication chip in response to one or more factors selected from a group of factors consisting of: termination of near-field communication operations by the electronic device, the electronic device being placed in an idle state, the electronic device being placed in a resting position, and a certain amount of time passing from when the near-field communication chip was activated.

* * * * *